United States Patent [19]

Carpenter et al.

[11] Patent Number: 5,275,984
[45] Date of Patent: Jan. 4, 1994

[54] FIBER COATING OF UNBONDED MULTI-LAYERS FOR TOUGHENING CERAMIC FIBER-MATRIX COMPOSITES

[75] Inventors: Harry W. Carpenter, Northridge; James W. Bohlen, Fountain Valley, both of Calif.

[73] Assignee: Northrop Corporation, Hawthorne, Calif.

[21] Appl. No.: 669,137

[22] Filed: Mar. 13, 1991

[51] Int. Cl.$^5$ .............. B32B 18/00; C04B 35/71
[52] U.S. Cl. .................. 501/95; 428/367; 428/368; 428/378; 428/380; 428/384; 428/902
[58] Field of Search ............. 428/288, 361, 367, 368, 428/378, 380, 384, 388, 389; 501/95

[56] References Cited

U.S. PATENT DOCUMENTS

| | | | |
|---|---|---|---|
| 4,405,685 | 9/1983 | Honjo et al. | 428/368 |
| 4,732,877 | 3/1988 | Olson et al. | 501/95 |
| 4,772,524 | 9/1988 | Coblenz | 428/699 |
| 4,837,230 | 6/1989 | Chen et al. | 501/88 |
| 4,863,798 | 9/1989 | Arenz et al. | 428/368 |
| 4,867,761 | 9/1989 | Brandt et al. | 51/309 |
| 4,885,199 | 12/1989 | Corbin et al. | 428/113 |
| 4,919,991 | 4/1990 | Gadkaree | 428/113 |
| 4,935,387 | 6/1990 | Beall et al. | 501/3 |
| 5,017,528 | 5/1991 | Tiegs et al. | 501/95 |
| 5,026,604 | 6/1991 | Thebault | 428/367 |
| 5,057,465 | 10/1991 | Sakamoto et al. | 501/90 |
| 5,134,020 | 7/1992 | Cotteret et al. | 428/212 |

FOREIGN PATENT DOCUMENTS

0172082 2/1986 European Pat. Off. .

*Primary Examiner*—George F. Lesmes
*Assistant Examiner*—Christopher Brown
*Attorney, Agent, or Firm*—Terry J. Anderson; Robert B. Block; Karl J. Hoch, Jr.

[57] ABSTRACT

A composite comprising a ceramic matrix having immersed ceramic reinforcing fibers is strengthened and toughened by providing a multi-layer ceramic coating surrounding each fiber. The multiple layers in the fiber coating are not bonded to one another. As a result, the multiple layers separate from one another in the presence of an advancing crack in the ceramic matrix, thereby permitting the fibers to pull out of the matrix and avoid premature fiber breakage. The choice of materials for the fiber coating is not limited by any requirement to establish a particular type of chemical bond between the coating and the fiber. Instead, the invention relies only upon the mechanical tendency of the unbonded multiple layers in the fiber coating to separate to promote fiber pull-out from the matrix in the wake of an advancing crack.

30 Claims, 1 Drawing Sheet

FIBER COATING OF UNBONDED MULTI-LAYERS FOR TOUGHENING CERAMIC FIBER-MATRIX COMPOSITES

BACKGROUND OF THE INVENTION

1. Technical Field

The invention is related to methods for forming ceramic matrix composites having ceramic fibers coated with a toughening layer which facilitates fiber de-bonding and pull-out in the wake of a crack in the matrix.

2. Background Art

Fiber reinforced ceramic matrix composites comprise a weave of ceramic fibers embedded in a ceramic matrix. One way of improving the mechanical properties of such a composition is to provide a coating over the fibers which is stable and resistant to oxidation and which promotes fiber de-bonding at the tip of an advancing crack and fiber bridging and eventually pull-out in the wake of an advancing crack in the composite. This feature enhances the toughness, strength and strain to failure of the composite because the fibers remain mostly immune to advancing cracks in the matrix. The history of development of this technique is described in U.S. Pat. No. 4,885,199 to Corbin et al.

For certain applications, the ceramic matrix composite must be stable at temperatures above 2200 degrees F. in an oxidizing environment. Well-known fiber coatings such as carbon and boron nitride are not stable under such conditions. Any material to be substituted for a fiber coating in place of the carbon or boron nitride must be both resistant to oxidation and must possess sufficient strength to transfer loads from the matrix to the fiber while having a low shear strength to promote debonding between the fiber and the matrix in the presence of an advancing crack. Furthermore, the coating must be easy to apply to macrofibers, fiber tows and to a weave of ceramic fibers during manufacturing.

U.S. Pat. No. 4,935,387 and U.S. Pat. No. 4,948,758, both to Beall et al., disclose a sheet silicate coating on fibers which promotes fiber pull-out by cleavage failures between crystal sheets. These two patents by Beall et al. rely upon the nature of the crystalline cleavage or the inherent intrinsic bond between the silicate sheets to promote fiber pull-out. U.S. Pat. No. 4,405,685 to Honjo et al. describes a graded metal carbide coating on carbon fibers for isolating the fibers. U.S. Pat. No. 4,837,230 to Chen et al. discloses a sandwich structure of alternate layers of fiber reinforced composites formed by repeated impregnations with polycarbosilane, for example. U.S. Pat. No. 4,867,761 to Brandt et al. discloses coated whiskers in a whisker reinforced composite. U.S. Pat. No. 4,919,991 to Gadkaree discloses a continuous fiber reinforced glass matrix with particles such as SiC for matrix reinforcement.

The prior art as described in U.S. Pat. No. 4,885,199 referenced above typically relied upon the characteristics of the inherently weak shear strength of carbon and boron nitride coatings and a single weak interfacial bond between the fiber and coating to achieve desired characteristics, such as toughening. For applications in the high temperature oxidizing environments described above, the intrinsic properties of the coating composition would have to provide all of the necessary features, including fiber de-bonding and pull-out as well as imperviousness to oxidation and high temperatures. The problem with this approach is that it is very difficult to select the best fiber coating material for a given ceramic fiber so as to optimize all of the foregoing features in the same coating material composition.

Thus, one object of the present invention is to depart from the prior art approach of finding a coating composition which provides all of the necessary features, and instead find a mechanical approach in which all, or at least some, of the desired features (such as fiber de-bonding and pull-out in the wake of an advancing crack in the matrix) are realized through the mechanical features of the coating and coating/fiber interface, as distinguished from the inherent features of the composition. Such a mechanical approach has many advantages and, in most cases, allows greater choice in selecting the materials for use in the coating. For example, materials can be chosen to meet only the requirement of resistance to oxidation and stability at high temperatures, while the remaining requirements (e.g., fiber de-bonding and pull-out) are met by mechanical features in the coating or coating/fiber interface. In fact, the same composition as the fiber and/or the matrix would be a candidate for the fiber coating. These advantages will become clear in the description of the invention which follows the conclusion of this description of the background art.

In the present invention, the mechanical feature which promotes the requisite tendencies (e.g., fiber de-bonding and pull-out in the wake of an advancing crack in the fiber/matrix composite) is a fiber coating having thin multiple ceramic layers which are not bonded to one another or are weakly bonded and separable. Thus, the present invention, as will be described below, does not rely on the nature of the intrinsic properties of the coating material, the chemical bonds between the fiber coating and the fiber, nor upon the nature of the chemical bonds between the fiber coating and the matrix to promote fiber de-bonding and pull-out.

This contrasts with the technique disclosed in European Patent Publication No. 0 172 082 by Thebaut, which depends upon the existence of particular materials composed of weakly bonded layers (namely carbon or boron nitride) to promote fiber de-bonding and pull-out in the wake of an advancing crack in the matrix. Establishing such an intrinsic behavior severely limits the choice of materials, a significant disadvantage.

Accordingly, it is an object of the invention to provide a method for forming on a ceramic fiber a multi-layer coating whose layers are unbonded or separable and permit the fiber to de-bond and pull out from the coating under stress.

It is a further object of the invention to provide a ceramic fiber/ceramic matrix composite having a multi-layer coating covering the fibers, the multiple layers in the fiber coating being unbonded or separable from one another to promote fiber de-bonding at the leading tip of the crack and pull-out from the coating in the wake of the advancing crack in the ceramic matrix.

It is another object of the invention to provide a ceramic multi-layer coating for ceramic fibers which are to be immersed in a ceramic matrix, in which the ceramic coating comprises oxidation resistant oxide materials such as tantalum pentoxide, alumina or zirconia, or non-oxide materials such as silicon carbide or silicon nitride.

It is a related object of the invention to provide a method for inducing layering in a ceramic fiber coating deposited on ceramic fibers in which the fiber coating consists of oxidation resistant oxide or non-oxide ceramic materials having no inherent layering tendencies.

It is yet another object of the invention to provide a multi-layer ceramic fiber coating in accordance with the foregoing objects for a fiber/matrix composite in which the fiber and matrix consist of different ceramic materials and in which the multiple layers in the coating consist of different materials compatible with respective ones of the different fiber and matrix ceramic materials.

SUMMARY OF THE INVENTION

A composite comprising a ceramic matrix having immersed ceramic reinforcing fibers is strengthened and toughened by providing a multi-layer ceramic coating surrounding each fiber. The multiple layers in the fiber coating are not bonded to one another or are only weakly bonded. As a result, the multiple layers separate from one another when intersected by an advancing crack in the ceramic matrix, thereby avoiding premature fracture of the fibers and permitting the fibers to pull out of the matrix to bridge the crack opening.

In the present invention, the choice of materials for the fiber coating is not limited by any requirement to establish a particular type of chemical bond between the coating and the fiber. Instead, the invention relies only upon the mechanical tendency of the unbonded multiple layers in the fiber coating to separate to avoid premature fiber fracture and to promote fiber pull-out from the matrix in the wake of an advancing crack. In one embodiment of the invention, ceramic materials for the fiber coating are freely selected which are more resistant to oxidation than those useful in the technique of Thebaut referenced above, a significant advantage. In fact, the invention in one embodiment induces layering in the fiber coating using oxidation resistant oxide materials (such as tantalum pentoxide, alumina or zirconia) or non-oxide materials (such as silicon carbide) having no inherent tendencies to form multiple layers.

In accordance with one embodiment of the invention, the oxidation-resistant non-oxide materials include silicon carbide and silicon nitride, which have no inherent layering tendencies. Layering without bonding between layers is accomplished by depositing alternating layers of silicon carbide and silicon nitride on the fibers. In another embodiment, separate layers of the same material (such as silicon nitride) are deposited in separate chemical vapor depositions using different deposition rates and temperatures for each layer so that successive layers are formed with different morphologies, thereby preventing formation of strong chemical bonds between layers. In yet another embodiment, each successive layer is poisoned with an impurity to prevent inter-layer bonding.

BRIEF DESCRIPTION OF THE DRAWINGS

The invention is described below in detail with reference to the accompanying drawings, of which.

DETAILED DESCRIPTION OF THE INVENTION

Figure 1:
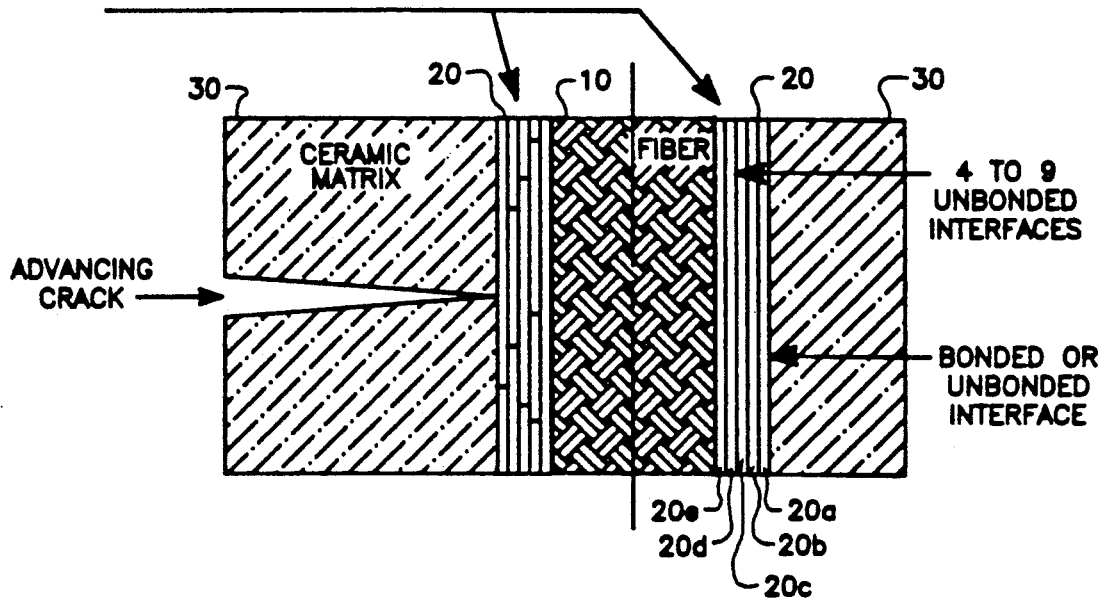
FIG. 1 is a cross-sectional view of a ceramic fiber/ceramic matrix composite embodying the present invention intersecting an advancing crack in the matrix.
Figure 2:
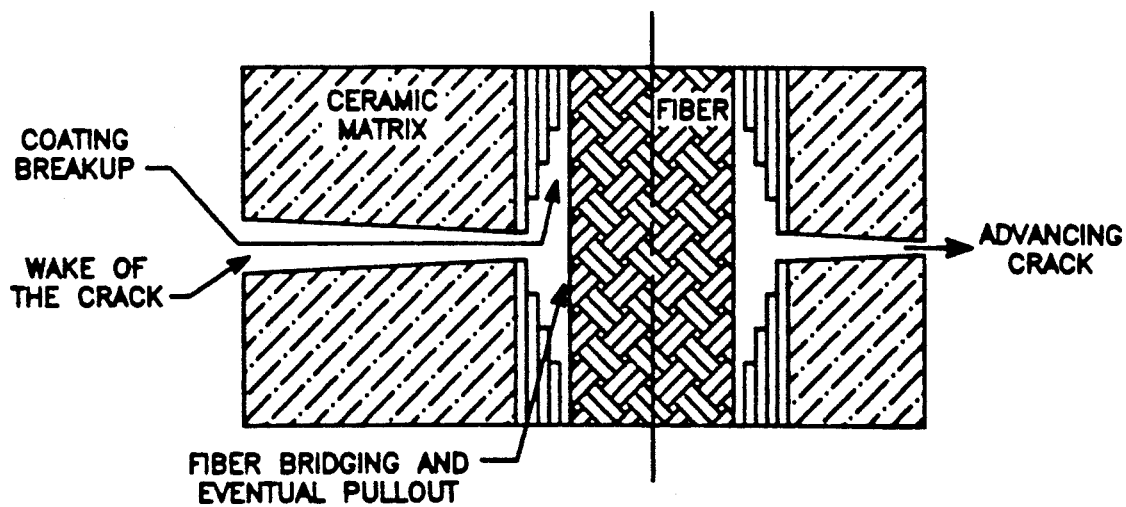
FIG. 2 is a cross-sectional view corresponding to that of FIG. 1 in which the fiber has slipped through the matrix to bridge the crack displacement in the wake of the advancing crack.

Referring to FIG. 1, a ceramic fiber 10 such as a silicon carbide fiber for example, is covered with a multi-layer ceramic coating 20. The fiber 10 and coating 20 are immersed in a ceramic matrix 30 to form a ceramic fiber/matrix composite using well-known techniques.

The multi-layer fiber coating 20 consists of multiple parallel thin layers 20a, 20b, 20c, 20d, 20e which are not chemically bonded to one another, or are only very weakly bonded. In the preferred embodiment, there are at least five to ten coating layers. In the embodiment of FIG. 1, there are five coating layers 20a-20e, providing a total of four unbonded interfaces within the coating 20. The total coating thickness is on the order of 0.25 to 1.0 microns. The coating 20 transmits loads from the matrix 30 to the fiber 10 due to the intimate fit between layers so that the fiber 10 reinforces the matrix 30. The material of each of the coating layers 20a-20e is preferably an oxidation resistant oxide ceramic such as tantalum pentoxide, alumina or zirconia, or non-oxide ceramic such as silicon carbide or silicon nitride, for example.

In order to prevent bonding between the multiple coating layers 20a-20e, one of several methods may be employed. In a preferred method, bonding between the multiple layers 20a-20e is prevented by forming the layers in separate chemical vapor deposition steps of different non-oxide oxidation resistant ceramics. In one embodiment of this method, the layers 20a-20e are alternate layers of silicon nitride and silicon carbide. The alternate layers of silicon nitride and silicon carbide are formed in separate steps using conventional techniques so that no chemical bonds are formed between the layers. Chemical vapor deposition or sol gel techniques may be employed.

As one aspect of the foregoing embodiment of the invention in which the coating layers 20a-20e are of different ceramic materials, compatibility with a fiber 10 of a first ceramic material and a matrix 30 of a second ceramic material may be provided by forming the inner coating layer 20e of the first ceramic material and forming the outer coating layer 20a of the second ceramic material. In this aspect of the invention, the fiber coating layers 20a-20e are graded to provide compatibility with different ceramic materials in the fiber 10 and the matrix 30.

In another embodiment, chemical bonding between the multiple coating layers 20a-20e is prevented by forming adjacent coating layers to have different morphologies. This may be accomplished in accordance with one aspect by using chemical vapor deposition techniques to form each of the multiple layers 20a-20e in separate chemical vapor deposition steps. Adjacent ones of the coating layers 20a, 20b, 20c, 20d, 20e are deposited at a different temperature or a different deposition rate or both.

In a different embodiment of the invention, chemical bonding between the multiple coating layers 20a-20e is prevented by modifying the coating surfaces by RF plasma treatments to the deposited layers. This may be accomplished in accordance with one aspect by using sol gel deposition techniques to form each of the multiple oxide layers 20a-20e in separate sol gel coating steps. After each step, the exterior coating surface is modified by RF plasma treatment to reduce the tendency for chemical bonding to the subsequent oxide layer.

In yet another embodiment of the invention, chemical bonding between the multiple layers 20a-20e is prevented by chemically "poisoning" the successive layers 20a-20e. Thus, for example, if each of the layers 20a-20e is formed in a separate chemical vapor deposition step, then each layer is permitted to absorb or react with chemical impurities which inhibit the formation of chemical bonds with the next layer to be deposited. The subsequent layer will not bond to the poisoned underlying layer but the coating layers will be in intimate contact as illustrated in FIG. 1. This intimate contact facilitates load transfer across the multiple coating layers 20a-20e, but will not preclude fiber pull-out.

The advantage of the invention is illustrated in the drawing, showing how an advancing crack in the matrix 30, upon reaching the fiber coating 20, is absorbed by the separation of adjacent coating layers 20a-20e, thereby allowing the fiber 10 to pull out from the coating 20 and the matrix 30, thus avoiding premature fracture from the advancing crack in the matrix 30.

While the invention has been described in detail with reference to preferred embodiments thereof, it is understood that variations and modifications thereof may be made without departing from the true spirit and scope of the invention.

What is claimed is:

1. A ceramic fiber/ceramic matrix composite, comprising:
   a ceramic fiber;
   a multi-layer ceramic coating on said fiber comprising plural separable parallel layers which are at least nearly free of chemical bonds between said layers; and
   a ceramic matrix contacting said coating, said fiber and coating being immersed in said ceramic matrix, said layers of said coating being separated upon said coating being intersected by a crack advancing in said matrix, whereby said crack is absorbed and said composite is toughened.

2. The composite of claim 1 wherein said layers comprise an oxidation resistant non-oxide ceramic material.

3. The composite of claim 2 wherein said material is selected from the group of oxidation resistant non-oxide ceramics consisting of $Si_3N_4$ and SiC.

4. The composite of claim 3 wherein different ones of said layers comprise different materials of said group.

5. The composite of calm 4 wherein said coating comprises alternate layers of $Si_3N_4$ and SiC.

6. The composite of claim 4 wherein said coating comprises an inner coating layer contacting said fiber and an outer coating layer contacting said matrix, said outer coating layer and said matrix comprising a first ceramic material and said inner coating layer and said fiber comprising a second ceramic material.

7. The composite of claim 1 wherein said layers comprise an oxidation resistant oxide ceramic material.

8. The composite of claim 7 wherein said material is selected from the group of oxidation resistant oxide ceramics consisting of tantalum pentoxide, zirconia and alumina.

9. The composite of claim 8 wherein different ones of said layers comprise different materials of said group.

10. The composite of claim 9 wherein said coating comprises alternate layers of zirconia and alumina.

11. The composite of claim 9 wherein said coating comprises an inner coating layer in contact with said fiber and an outer coating layer in contact with said matrix, said outer coating layer and said matrix comprising a first ceramic material and said inner coating layer and said fiber comprising a second ceramic material.

12. The composite of claim 1 wherein said fiber, said layers, and said matrix comprise a same ceramic material.

13. The composite of claim 1 wherein adjacent ones of said layers are formed of different morphologies, whereby chemical bonding therebetween is inhibited.

14. The composite of claim 1 wherein each of said layers further comprises absorbed or reacted chemical impurities whereby chemical bonding between adjacent ones of said layers is inhibited.

15. The composite of claim 1 wherein said layers are formed in separate deposition steps, each of said deposition steps including an RF plasma surface modification step whereby chemical bonding between adjacent ones of said layers is inhibited.

16. A composite of ceramic fibers immersed in a ceramic matrix, each of said fibers being covered by a ceramic fiber coating deposited thereon in direct contact with both said fiber and said matrix, said fiber coating being characterized by a plurality of parallel separable coating layers which are at least nearly free of chemical bonds between said layers, whereby said layers are rendered separable so as to promote fiber debonding and pullout from said matrix upon said fiber coating being intersected by an advancing crack in said matrix.

17. The composite of claim 16 wherein said layers comprise an oxidation resistant non-oxide ceramic material.

18. The composite of claim 17 wherein said material is selected from the group of oxidation resistant non-oxide ceramics consisting of $Si_3N_4$ and SiC.

19. The composite of claim 18 wherein different ones of said layers comprise different materials of said group.

20. The composite of claim 19 wherein said fiber coating comprises alternate layers of $Si_3N_4$ and SiC.

21. The composite of claim 19 wherein said fiber coating comprises an inner coating layer contacting said fiber and an outer coating layer contacting said matrix, said outer coating layer and said matrix comprising a first ceramic material and said inner coating layer and said fiber comprising a second ceramic material.

22. The composite of claim 16 wherein said layers comprise an oxidation resistant oxide ceramic material.

23. The composite of claim 22 wherein said material is selected from the group of oxidation resistant oxide ceramics consisting of tantalum pentoxide, zirconia and alumina.

24. The composite of claim 23 wherein different ones of said layers comprise different materials of said group.

25. The composite of claim 24 wherein said fiber coating comprises alternate layers of zirconia and alumina.

26. The composite of claim 24 wherein said fiber coating comprises an inner coating layer in contact with said fiber and an outer coating layer in contact with said matrix, said outer coating layer and said matrix comprising a first ceramic material and said inner coating layer and said fiber comprising a second ceramic material.

27. The composite of claim 16 wherein said fiber, said layers, and said matrix comprise a same ceramic material.

28. The composite of claim 16 wherein adjacent ones of said multiple coating layers are formed of different morphologies, whereby chemical bonding therebetween is inhibited.

29. The composite of claim 16 wherein each of said layers further comprises absorbed or reacted chemical impurities whereby chemical bonding between adjacent ones of said layers is inhibited.

30. The composite of claim 16 wherein said layers are formed in separate deposition steps, each of said deposition steps including an RF plasma surface modification step whereby chemical bonding between adjacent ones of said layers is inhibited.

* * * * *